US005717724A

United States Patent [19]

Yamazaki et al.

[11] Patent Number: 5,717,724

[45] Date of Patent: Feb. 10, 1998

[54] VOICE ENCODING AND VOICE DECODING APPARATUS

[75] Inventors: Yasushi Yamazaki; Tomohiko Taniguchi; Tomonori Sato, all of Kawasaki; Hisanari Kimura, Fukuoka, all of Japan

[73] Assignee: Fujitsu Limited, Kanagawa, Japan

[21] Appl. No.: 511,417

[22] Filed: Aug. 4, 1995

[30] Foreign Application Priority Data

Oct. 28, 1994 [JP] Japan .................................... 6-265735

[51] Int. Cl.[6] .............................. G10L 3/02; H04L 27/06

[52] U.S. Cl. ............................................ 375/346; 395/2.17

[58] Field of Search .................................... 375/346, 349, 375/350; 381/46; 395/2.35, 2.42, 2.17, 2.23, 2.36, 2.37; 455/50.1, 63, 296, 297

[56] References Cited

U.S. PATENT DOCUMENTS 5,327,461 7/1994 Kushige .................................. 375/244
5,448,679 9/1995 McKiel, Jr. ............................ 395/2.17

*Primary Examiner*—Stephen Chin
*Assistant Examiner*—Kevin Kim
*Attorney, Agent, or Firm*—Helfgott & Karas, P.C.

[57] ABSTRACT

To improve the voice quality of a digital mobile communication system such as a car telephone or portable telephone when outdoor background noises are superimposed on voices. To achieve the above object, a voice decoding apparatus comprises noise superimposed part detecting means for discriminating between a noise part containing only noises and a voice part containing voices from signal encoded at a transmission side, voice decoding means for decoding an encoded signal in the voice part into a waveform signal, noise decoding means for decoding an encoded signal in the noise part into a waveform signal, and noise control means for controlling the frequency characteristic of said noise part by controlling said noise decoding means when said noise superimposed part detecting means judges the noise part.

8 Claims, 13 Drawing Sheets

VOICE ENCODING AND VOICE DECODING APPARATUS

BACKGROUND OF THE INVENTION (1) Field of the Invention

The present invention relates to an art for improving the encoding quality and the noise-superimposed-voice transmission quality of digital mobile radio communication systems such as a car telephone and a portable telephone when outdoor background noises are superimposed on voices.

(2) Description of the Prior Art

In recent years, digital mobile radio communication systems including a car telephone and a portable telephone have been popular because of improvement of the communication art. Therefore, an audio signal processor for efficiently compressing an audio signal has been requested.

Moreover, it is preferable that a digital mobile radio communication system encodes an audio signal of a 4-kHz band at a bit rate of 4 to 8 kbps in order to effectively use radio frequencies. The CELP system is known as a voice encoding system corresponding to the above system.

The CELP system analyzes an audio signal in accordance with the linear prediction theory to extract a parameter showing a frequency characteristic. Moveover, the CELP system encodes a driving-sound-source signal as a waveform by means of vector quantization. Furthermore, the CELP system decodes encoded voices transmitted through a transmission line at the reception side in accordance with a procedure opposite to that at the transmission side.

Furthermore, the CELP system compresses an audio signal to a low bit rate and also performs encoding (band compression) in accordance with a voice generation model in order to maintain the reproduced voice quality. In the case of the above encoding, an unnatural reproduced sound may be outputted when a background-noise-superimposed audio signal is encoded. That is, an existing encoding/decoding apparatus encodes a noise signal with a property different from a voice by assuming that the noise signal has the same property as the voice. Therefore, a signal consisting of only background noises is encoded though it does not have any frequency correlation and reproduced as an unnatural sound.

Moreover, the existing encoding/decoding apparatus refers to an adaptive code book in accordance with a voice waveform when encoding a voice and detects index information for a waveform pattern similar to the adaptive code book. However, when noises are superimposed on the voice, a waveform pattern similar to the adaptive code book is not present and thus, it is inevitable to select a waveform pattern not very similar to the book. Therefore, there is a problem that the voice is outputted as an unnatural voice when it is decoded.

When taking air conditioning sounds as background noises, the spectrum of the source of the air conditioning sounds shows an almost flat characteristic as shown in FIG. 13 and has a small time fluctuation. In the case of reproduced air conditioning sounds, however, it is found from FIG. 14 that the peak of spectrum envelopes fluctuates for each frame. The inventor of the present invention noticed that the fluctuation of spectrum envelopes caused audio unnaturalness and clarified the cause of the spectrum fluctuation. That is, because an existing voice decoding apparatus performs decoding by generating an excited signal in accordance with an adaptive code book and a noise code book and passing the excited signal through a synthesis filter, the inventor analyzed whether the spectrum fluctuation was caused by generation of the excited signal or by the synthesis filter. As a result, temporal fluctuation was not found in the spectrum of the excited signal. In the case of the synthesis filter, however, the fluctuation shown in FIG. 15 appeared.

BRIEF SUMMARY OF THE INVENTION

It is the first object of the present invention to provide an apparatus for outputting an aurally natural reproduced sound by controlling the characteristic of a synthesis filter when discriminating a signal containing only noises from a signal containing voices, differentiating the encoding from the decoding of the signal containing only noises, and decoding only noises. Moreover, it is the second object of the present invention to provide an art for encoding a signal in which noises are superimposed on voices at a high quality without being affected by noises.

The outline of the present invention is described below for each object.

Apparatus for achieving the first object

When the voice decoding apparatus of the present invention receives a signal encoded at the transmission side, noise superimposed part detecting means judges whether the encoded signal is an encoded signal in a noise part containing only noises or an encoded signal in a voice part containing voices.

In this case, when the received encoded signal is an encoded signal in the voice part, it is inputted to voice decoding means.

The voice encoding means encodes the encoded signal into a waveform signal.

However, when the received encoded signal is an encoded signal in the noise part, it is inputted to noise decoding means.

Then, the noise decoding means detects a waveform pattern corresponding to index information from a code book and excites the waveform pattern through a driving sound source. Then, an excited signal is inputted to a synthesis filter. At the same time, noise control means multiplies the filter factor of the synthesis filter by a positive value of 1 or less and sends the multiplication result to the synthesis filter. The synthesis filter filters the excited signal in accordance with the filter factor sent from the noise control means and outputs a decoded signal. Thereby, a waveform in the noise part is reproduced without the fact that the frequency characteristic is unnaturally stressed.

In this case, it is also possible to make the noise decoding means perform processing by setting the gain of the noise part to "0".

Moreover, it is possible to set a postfilter at the rear stage of the synthesis filter and thereby pass a noise waveform outputted from the synthesis filter through the postfilter without stressing the peak of the noise waveform (without performing any processing).

Then, a voice encoding apparatus for achieving the first object is described below.

When the voice encoding apparatus receives a signal from a telephone transmitter, the noise superimposed part detecting means discriminates whether the received signal is a signal in a voice part containing voices or a signal in a noise part containing only noises.

In this case, when the received signal is a signal in the voice part, the voice encoding means judges a waveform pattern similar to a waveform in the voice part and encodes the waveform pattern into index information to transmit it to the reception side.

When the received signal is a signal in the noise part, the noise encoding means judges a waveform pattern similar to a waveform in the noise part and encodes the waveform pattern to output index information. At the same time, control information generating means generates control information related to the decoding in the noise part and adds the control information to the above index information. Specifically, control information generating means linear-prediction-analyzes an input signal in the noise part, judges a frequency characteristic, and multiplies an obtained filter factor by a positive value of 1 or less to determine a filter factor of a synthesis filter to be used at the reception side. Then, the means transmits the filter factor to the reception side as control information together with index information.

Apparatus for achieving the second object

Then, a voice encoding apparatus for achieving the second object is described below.

In the case of the voice encoding apparatus, noise superimposed part judging means monitors a signal inputted from a telephone transmitter and judges whether the signal is included in the voice part containing only voices, noise part containing only noises, or noise superimposed part in which noises are superimposed on voices.

When it is judged that the signal is included in the noise superimposed part, inverse filtering means computes a prediction factor of the noise superimposed part and filters the signal by using the prediction factor as a filter factor. Thereby, a signal outputted from the inverse filtering means serves as a prediction residue signal. The prediction residue signal is inputted to noise removing means in which noises are removed from the signal.

The prediction residue signal from which noises are removed by the noise removing means is inputted to pitch cycle detecting means.

The pitch cycle detecting means computes an auto-correlation operation of the prediction residue signal and detects a pitch cycle in which the auto-correlation operation has the maximum value.

Then, the voice encoding means judges a waveform pattern similar to a waveform in the noise superimposed part in accordance with the pitch cycle detected by the pitch cycle detecting means and decodes the waveform pattern to output index information. Thereby, it is possible to encode a voice signal without being affected by noises.

The present invention makes it possible to decrease a sense of incompatibility at the time of reproduction by preventing unnatural frequency characteristic from being added to noises with a small change of frequency characteristic.

Moreover, the present invention makes it possible to encode a signal in which noises are superimposed on voices at a high quality by removing noise components from the signal and detecting an accurate pitch cycle.

Therefore, it is possible to contribute to improvement of the quality of voices of mobile communication systems such as a portable telephone and a car telephone.

DETAILED DESCRIPTION OF THE PREFERRED EMBODIMENTS

Embodiments of the present invention are described below by referring to the accompanying drawings.

EMBODIMENT 1

Figure 1:
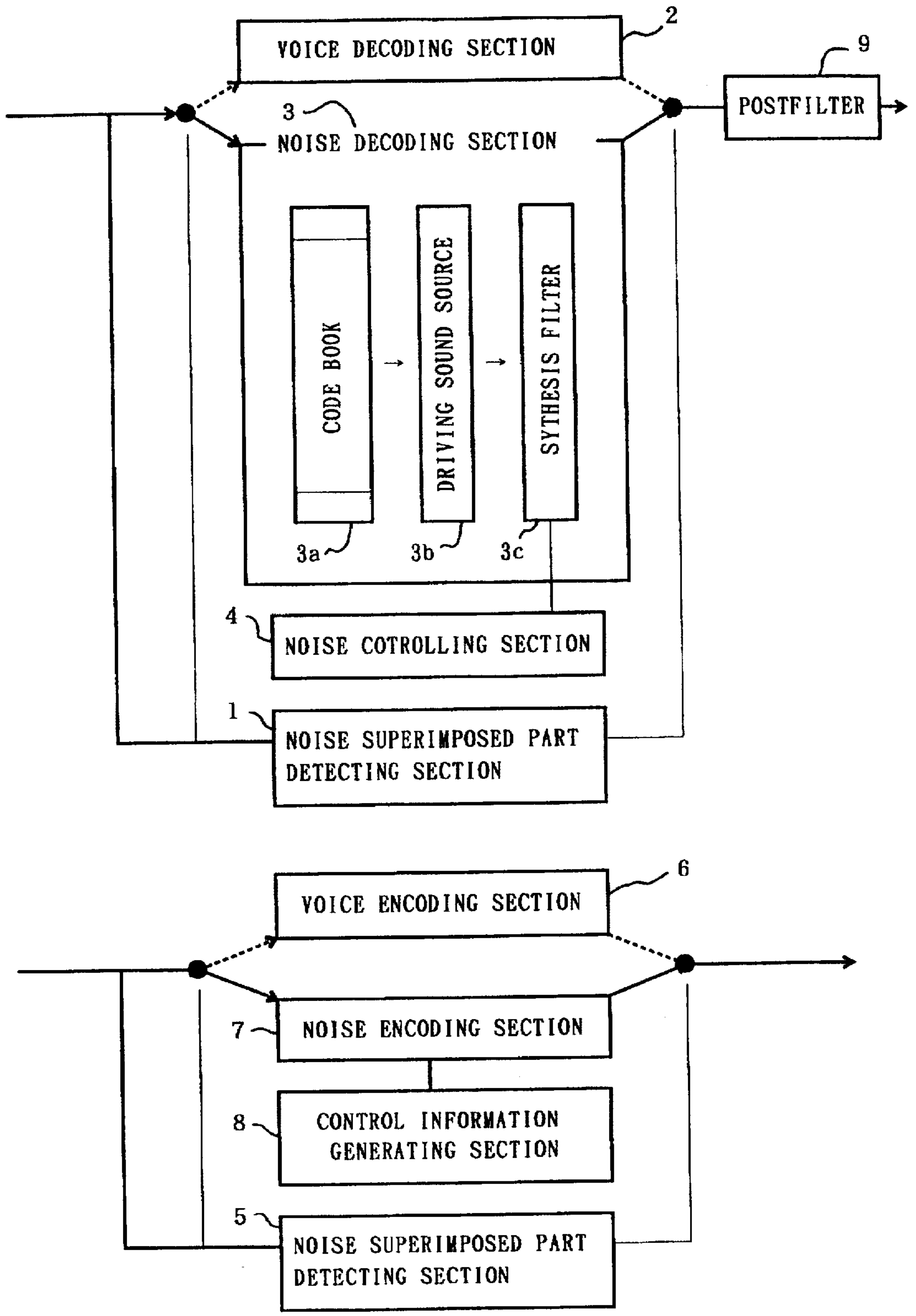
FIG. 1 is a schematic block diagram of the voice communication apparatus in embodiment 1.

FIG. 1 shows a rough structure of the voice communication system of embodiment 1.

A voice decoding apparatus is set at the reception side of the voice communication system and a voice encoding apparatus is set at the transmission side of the system.

First, the voice decoding apparatus is described below.

(Voice decoding apparatus)

The voice decoding apparatus comprises a noise superimposed part detecting section 1, a voice decoding section 2, a noise decoding section 3, and a noise controlling section 4.

The noise superimposed part detecting section 1 monitors a signal encoded at the transmission side to discriminate whether the signal is included in the voice part containing voices or the noise part containing only noises. For example, the noise superimposed part detecting section 1 discriminates the voice part from the noise part by detecting power from the encoded signal and judging whether the power is equal to or more than a preset threshold. That is, the noise superimposed part detecting section 1 judges a section as the voice part when the power of the encoded signal is equal to or more than the threshold and as the noise part when it is less than the threshold. It is also possible to use the gain of the encoded signal instead of the power.

The voice decoding section 2 decodes the encoded signal in the voice part into a waveform signal when the noise superimposed part detecting section 1 judges the encoded signal.

The noise decoding section 3 decodes the encoded signal in the noise part into a waveform signal when the noise superimposed part detecting section 1 judges the encoded signal. The noise decoding section 3 comprises a code book **3*a*, a driving sound source 3*b*, and a synthesis filter 3*c*. The code book 3*a* stores a waveform pattern every piece of index information. The driving sound source 3*b* excites a waveform pattern read out of the code book 3*a*. The synthesis filter 3*c* filters an excited signal outputted from the driving sound source 3*b***.

The noise controlling section 4 controls the filter factor of the synthesis filter 3*c* of the noise decoding section 3 to control the frequency characteristic of noises when the noise superimposed part detecting section 1 judges the encoded signal in the noise part. That is, the noise controlling section 4 determines a positive value of 1 or less to be multiplied with a filter factor and computes a new filter factor by multiplying the filter factor by the positive value.

Moreover, it is possible to set the postfilter 9 for amplifying the amplitude of a decoded signal outputted from the synthesis filter 3*c* to the rear stage of the noise decoding section 3 and the voice decoding section 2 respectively. The postfilter 9 directly passes a decoded signal in the noise part outputted from the noise decoding section 3.

Operations of a voice decoding apparatus are described below.

(Operations of voice decoding apparatus)

When receiving an encoded signal, the noise superimposed part detecting section 1 of the voice decoding apparatus judges whether the encoded signal is a signal in the noise part containing only noises or in the voice part containing voices.

When the received encoded signal is a signal in the voice part, the noise superimposed part detecting section 1 transfers the encoded signal to the voice decoding section 2.

The voice encoding section 2 encodes the encoded signal into a waveform signal to output it.

However, when the received encoded signal is a signal in the noise part, the noise superimposed part detecting section 1 transfers the encoded signal to the noise decoding section 3.

The noise decoding section 3 detects a waveform pattern corresponding to index information out of the code book 3*a* and excites the waveform pattern through the driving sound source 3*b*. Then, an excited signal is inputted to the synthesis filter 3*c*. At the same time, the noise controlling section 4 multiplies the filter factor of the synthesis filter 3*c* by a positive value of 1 or less and sends the multiplication result to the synthesis filter 3*c*. The synthesis filter 3*c* filters the excited signal in accordance with the filter factor sent from the noise controlling section 4 to output a decoded signal. Thereby, the waveform in the noise part is reproduced without the fact that the frequency characteristic is unnaturally stressed.

(Voice encoding apparatus)

A voice encoding apparatus is described below.

The voice encoding apparatus comprises a noise superimposed part detecting section 5, a voice encoding section 6, a noise encoding section 7, and a control information generating section 8.

The noise superimposed part detecting section 5 has a operation for monitoring a signal encoded at the transmission side and discriminating a signal in the voice part containing voices from a signal in the noise part containing only noises.

When the noise superimposed part detecting section 5 judges a voice part, the voice encoding section 6 encodes a waveform of the section and outputs index information. The index information is information for specifying a waveform. The voice encoding section 6 has a code book for storing a waveform pattern every piece of index information and performs encoding by using the code book.

When the noise superimposed part detecting section 5 judges a noise part, the noise encoding section 7 encodes a waveform of the section and outputs index information. The noise encoding section 7, same as the voice encoding section 6, has a code book for storing a waveform pattern every piece of index information and encodes a noise waveform by using the code book.

When the noise superimposed part detecting section 5 judges a noise part, the control information generating section 8 generates control information for decoding of the noise part and adds the control information to an encoded signal in the noise part. In this case, the control information is information for specifying the filter factor of a synthesis filter used at the reception side and determined in accordance with the waveform characteristic of noises.

Operations of the voice encoding apparatus are described below.

(Operations of voice encoding apparatus)

When receiving a signal from a telephone transmitter, the noise superimposed part detecting section 5 of the voice encoding apparatus discriminates whether the received signal is a signal in the voice part or a signal in the noise part.

When the signal received from the telephone transmitter is a signal in the voice part, the noise superimposed part detecting section 5 transfers the received signal to the voice encoding section 6.

The voice encoding section 6 judges a waveform pattern similar to a waveform in the voice part and encodes the waveform pattern to output index information. The index information outputted from the voice encoding section 6 is transmitted to the reception side.

On the other hand, when the signal received from the telephone transmitter is a signal in the noise part, the noise superimposed part detecting section 5 transfers the received signal to the noise encoding section 7.

Noise encoding section 7 judges a waveform pattern similar to a waveform in the noise part and encodes the waveform pattern to output index information. In this case, the control information generating section 8 judges a frequency characteristic by linear-prediction-analyzing an input signal in the noise part and computes a filter factor corresponding to the frequency characteristic. Then, the control information generating section 8 multiplies the filter factor by a positive value of 1 or less to determine a new filter factor. Moreover, the control information generating section 8 adds control information to the index information outputted from the noise encoding section 7 to transmit the added information to the reception side.

Thus, the voice decoding apparatus and the voice encoding apparatus of the embodiments of the present invention make it possible to output an aurally-natural reproduced sound by controlling the characteristic of a synthesis filter when differentiating the encoding from the decoding of the signal containing only noises and decoding only noises.

EMBODIMENT 2

Then, the second embodiment of the present invention is described below by referring to the accompanying drawings.

Figure 2:
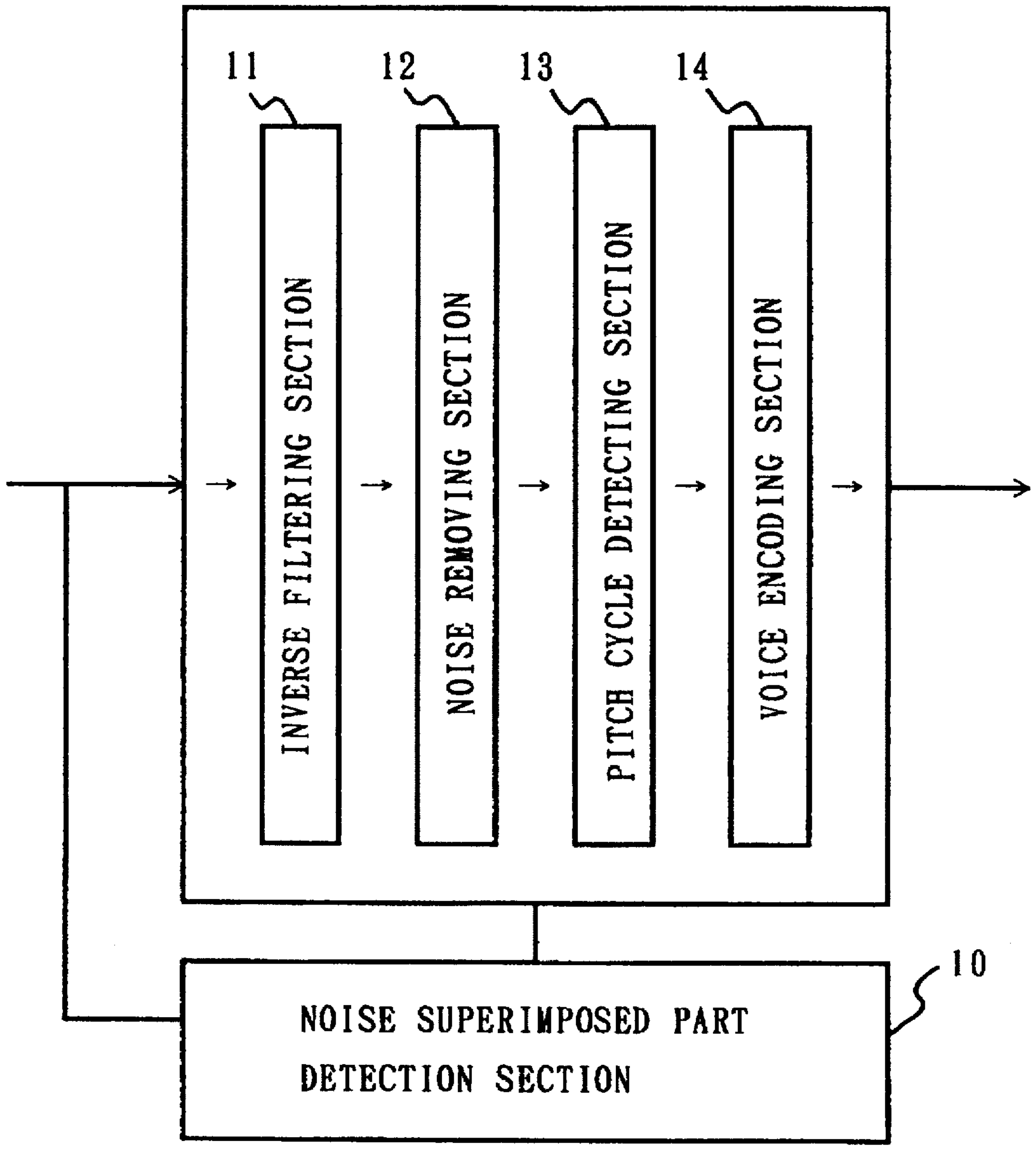
FIG. 2 is a block diagram of the structure of the voice encoding apparatus of embodiment 2.

FIG. 2 is a block diagram showing the structure of the voice encoding apparatus of this embodiment.

The voice encoding apparatus comprises a noise superimposed part detecting section 10, an inverse filtering section 11, a noise removing section 12, a pitch cycle detecting section 13, and a voice encoding section 14.

The noise superimposed part detecting section 10 monitors a signal inputted from a telephone transmitter and discriminates between a voice part containing only voices, a noise part containing only noises, and a noise superimposed part in which noises are superimposed on voices.

When the noise superimposed part detecting section 10 judges a noise superimposed part, the inverse filtering section 11 linear-prediction-analyzes the noise superimposed part to compute a linear prediction factor. Then, the inverse filtering section 11 inversely filters an input signal by using the linear prediction factor as a filter factor and outputs a prediction residue signal.

The noise removing section 12 removes noises from the prediction residue signal. The noise removing section 12 uses, for example, a low-pass filter.

The pitch cycle detecting section 13 computes an auto-correlation operation of a residue signal outputted from the noise removing section 12. Then, the pitch cycle detecting section 13 detects a pitch cycle when the auto-correlation operation has the maximum value. That is, the pitch cycle detecting section 13 shifts the prediction residue signal every specific cycle and detects a specific pitch cycle in which the correlation between each prediction residue signal and the original prediction residue signal is maximized as the pitch cycle.

The voice encoding section 14 encodes a waveform in the noise superimposed part in accordance with pitch cycle detected by the pitch cycle detecting section 13.

Operations of this embodiment are described below.

(Operations of voice encoding apparatus)

The noise superimposed part detecting section 10 of the voice encoding apparatus monitors a signal inputted from a telephone transmitter and judges whether the input signal is a signal in the voice part containing only voices, a signal in the noise part containing only noises, or a signal in the noise superimposed part in which noises are superimposed on voices.

In this case, when the input signal is a signal in the noise superimposed part, the noise superimposed part detecting section 10 transfers the input signal to the inverse filtering section 11.

The inverse filtering section 11 computes a prediction factor of the noise superimposed part. Then, the inverse filtering section 11 filters the input signal by using the prediction factor as a filter factor and outputs a prediction residue signal. The prediction residue signal outputted from the inverse filtering section 11 is inputted to the noise removing section 12.

The noise removing section 12 removes noises from the prediction residue signal and inputs it to the pitch cycle detecting section 13.

The pitch cycle detecting section 13 computes the auto-correlation operation of the prediction residue signal. Then, the pitch cycle detecting section 13 detects a pitch cycle when the auto-correlation operation of the prediction residue signal has the maximum value and sends it to the voice encoding section 14.

The voice encoding section 14 judges a waveform pattern similar to a waveform in the noise superimposed part in accordance with the pitch cycle sent from the pitch cycle detecting section 13. Then, the voice encoding section 14 encodes the judged waveform pattern to output index information. The index information outputted from the voice encoding section 14 is transmitted to the reception side.

Thereby, it Is possible to encode a signal in which noises are superimposed on voices at a high quality without being affected by noises.

EMBODIMENT 3

The third embodiment of the present invention is described below by referring to the accompanying drawings.

Figure 3:
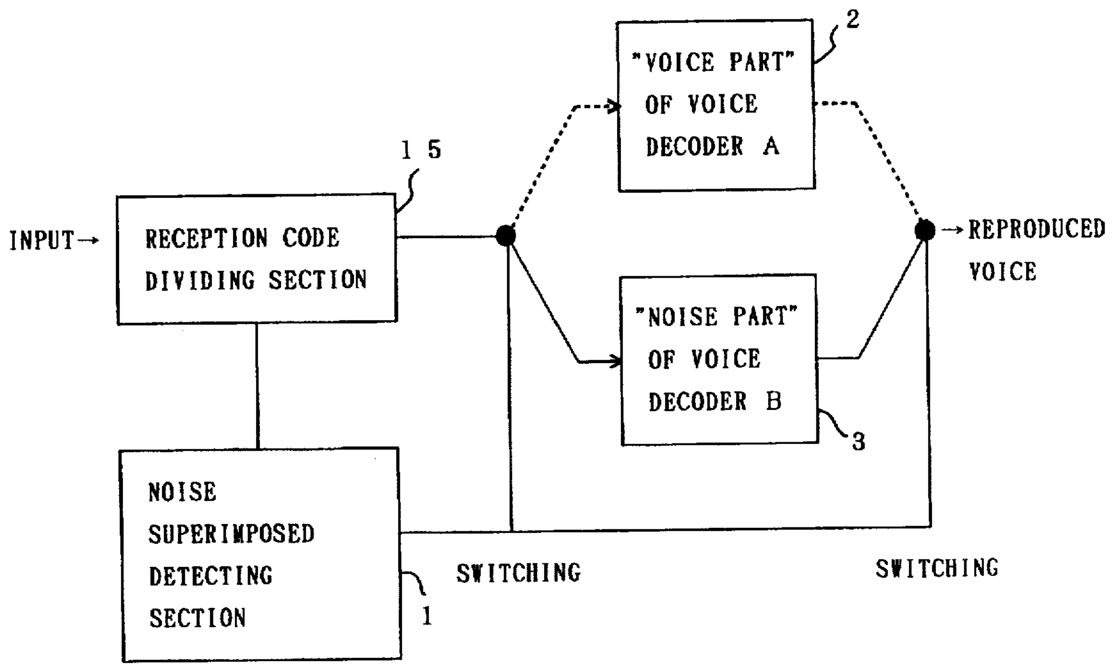
FIG. 3 is a schematic block diagram of the voice decoding system of embodiment 3.

FIG. 3 is a block diagram showing the structure of the voice decoding apparatus of this embodiment.

The voice encoding apparatus of this embodiment comprises a noise superimposition detection judging unit 1 serving as noise superimposed part detecting means, a voice decoder A (2) serving as voice encoding means, a voice decoder B (3) serving as noise decoding means, and a reception code dividing section 15.

The voice decoders A (2) and B (3) use the CELP system as a decoding system.

The reception code dividing section 15 has a operation for dividing an encoded signal received from the transmission side into power information, index information, and a synthesis filter factor.

The noise superimposition detection judging unit 1 has a operation for comparing the power information divided by the reception code dividing section 15 with a preset threshold and judging that the encoded signal is a signal in the voice part when the power information is equal to or larger than the threshold and that the encoded signal is a signal in the noise part when the power information is less than the threshold. Moreover, the noise superimposition detection judging unit 1 has a operation for inputting the encoded signal in the voice part to the voice decoder A (2) and the encoded signal in the noise part to the voice decoder B (3).

The voice decoder A (2) decodes an encoded signal in the voice part. Specifically, it has the same structure and operation as an existing CELP-system decoder. Therefore, the description of the decoder A (2) is omitted.

The voice decoder B (3) decodes an encoded signal in the noise part.

Figure 4:
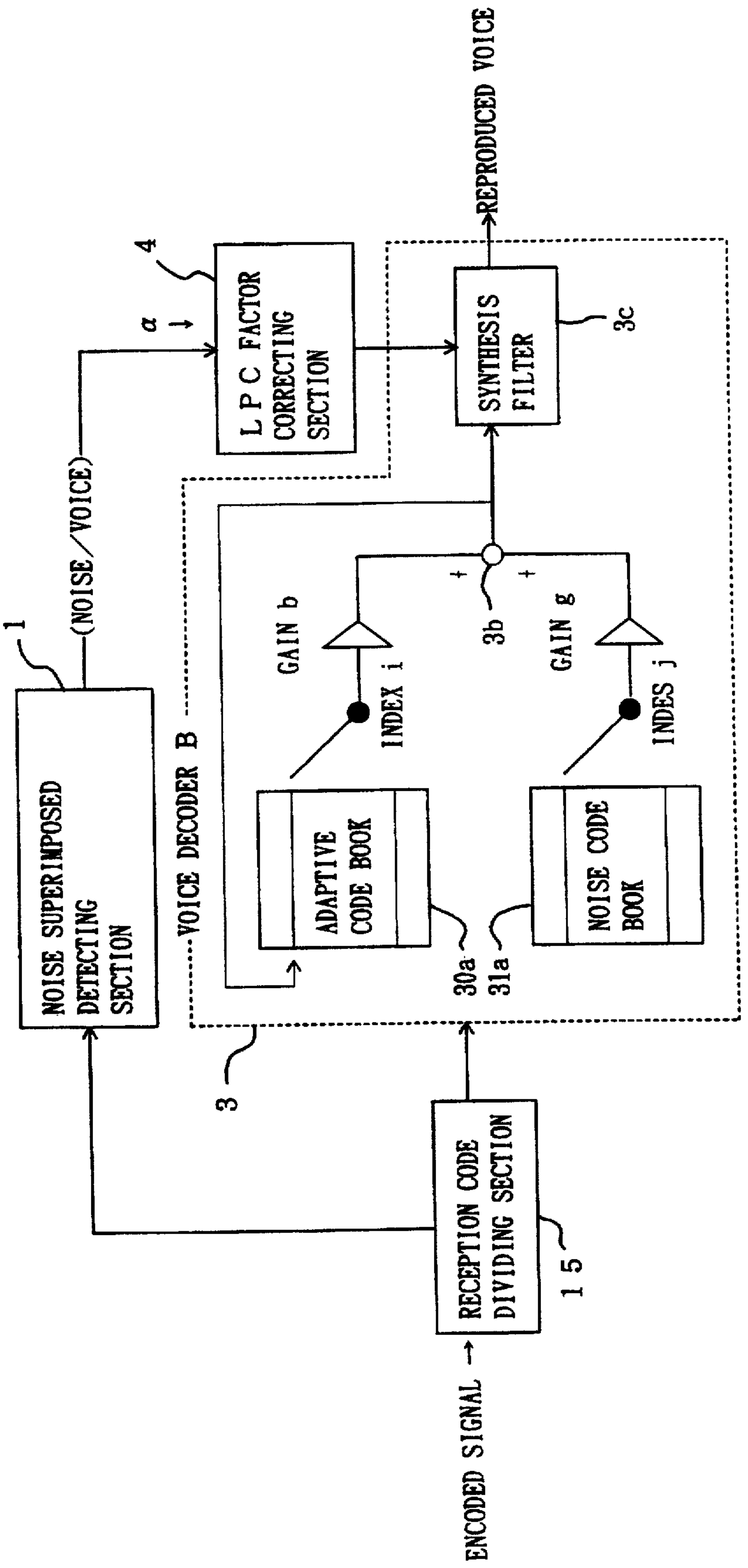
FIG. 4 is a block diagram of the internal structure of a voice decoder B.

FIG. 4 shows the internal structure and peripheral structure of the voice decoder B (3).

In FIG. 4, the voice decoder B (3) comprises an adaptive code book 30*a*, a noise code book 31*a*, a driving sound source 3*b*, and a synthesis filter 3*c*. Moreover, the synthesis filter 3*c* connects with an LPC factor correcting section 4 serving as noise control means of the present invention.

The adaptive code book 30*a* stores waveform patterns of waveform signals having a periodicity and index information and has a operation for updating waveform patterns in accordance with a decoded waveform signal.

The noise code book 31*a* stores waveform patterns of waveform signal having no periodicity and index information.

An amplification factor (gain) of waveform patterns read out of the adaptive code book 30*a* and the noise code book 31*a* are specified for the adaptive code book 30*a* and the noise code book 31*a*. The driving sound source 3*b* has a operation for exciting waveform patterns read out of the adaptive code book 30*a* and the noise code book 31*a* in accordance with their own gain.

The synthesis filter 3*c* filters an excited signal outputted from the driving sound source 3*b* and decodes it into a waveform signal. The filter factor of the synthesis filter 3*c* is determined at the transmission side. That is, the transmission side linear-prediction-analyzes the original waveform signal to compute a linear prediction factor and transmits the linear prediction factor to the reception side as a filter factor. Thereby, the voice decoder B (3) detects a filter factor from an encoded signal to use it as the filter factor of the synthesis filter 3*c*.

The LPC factor correcting section 4 has a operation for receiving a judgment result of the noise superimposition detection judging unit 1 and correcting the filter factor of the synthesis filter 3*c*. Specifically, it has a operation for correcting the filter factor of the synthesis filter 3*c* by multiplying the filter factor by a positive value of 1 or less as shown by the expression below.

$$\alpha'_i = g^i \times \alpha_i \quad (0.0 < g \leqq 1.0)$$

Figure 12:
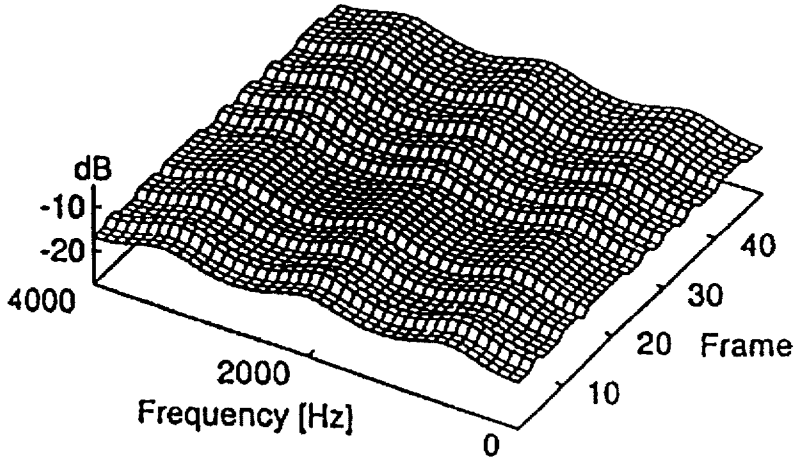
FIG. 12 is a spectrum showing the frequency characteristic of a synthesis filter.
Figure 13:
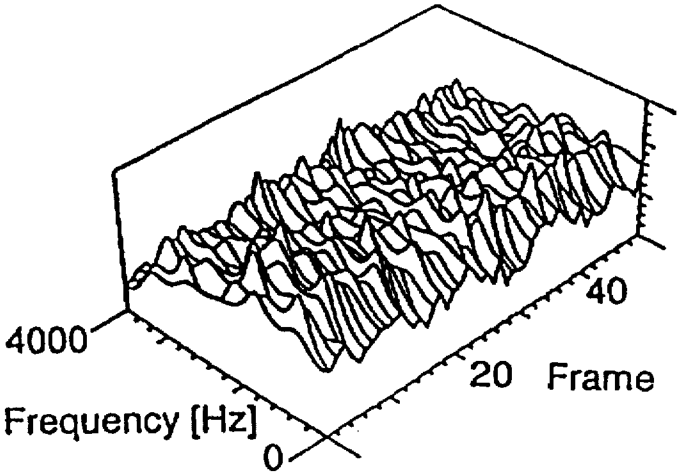
FIG. 13 is an illustration showing the spectrum of an air conditioning sound source.
Figure 14:
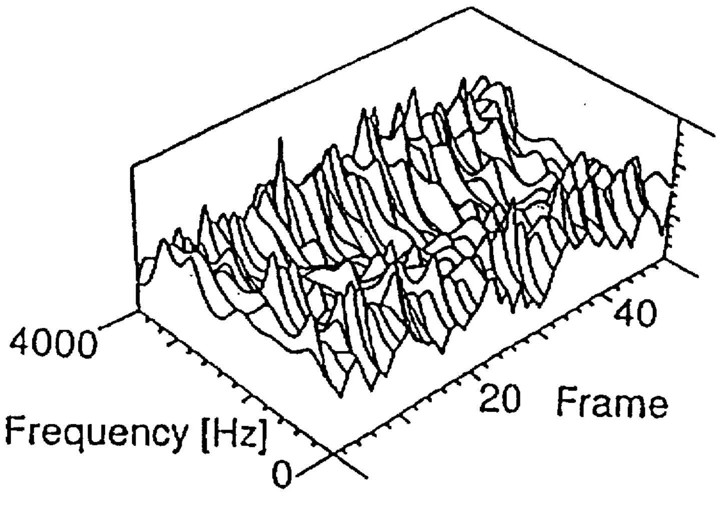
FIG. 14 is an illustration showing the spectrum of reproduced air conditioning sounds.
Figure 15:
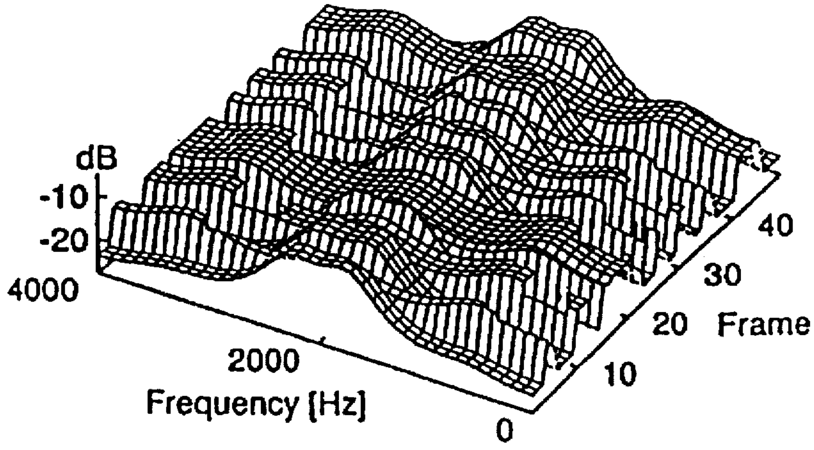
FIG. 15 is a spectrum showing the frequency characteristic of a synthesis filter.

Thereby, it is possible to convert the frequency characteristic of the synthesis filter 3*c* into an almost flat characteristic (see FIG. 12).

Operations of the voice decoding apparatus are described below.

(Operations of voice decoding apparatus)

In the case of the voice decoding apparatus, the reception code dividing section 15 receives a signal encoded at the reception side.

The reception code dividing section 15 divides the encoded signal into power information, index information, and a filter factor and inputs the power information to the noise superimposition detection judging unit 1.

The noise superimposition detection judging unit 1 judges whether the power information is equal to or larger than or less than a threshold. When the power information is equal to or larger than the threshold, the noise superimposition detection judging unit 1 judges that the encoded signal is a signal in the voice part and inputs the power information, index information, and filter factor divided by the reception code dividing section 15 to the voice decoder A (2). The voice decoder A (2) decodes the encoded signal into a voice waveform in accordance with these pieces of information.

However, when the power information is less than the threshold, the noise superimposition detection judging unit 1 judges the encoded signal is a signal in the noise part and inputs the power information and index information divided by the reception code dividing section 15 to the voice decoder B (3) and also sends the filter factor to the LPC factor correcting section 4.

The voice decoder B (3) retrieves the adaptive code book 30*a* or the noise code book 31*a* in accordance with the index information to detect a necessary waveform pattern. The driving sound source 3*b* excites the waveform pattern in accordance with the gain in each code book and inputs an excited signal to the synthesis filter 3*c*.

In this case, the LPC factor correcting section 4 corrects the filter factor by multiplying the filter factor by a positive value of 1 or less and then, sends the corrected filter factor to the synthesis filter 3*c*.

The synthesis filter 3*c* filters the excited signal outputted from the driving sound source 3*b* in accordance with the filter factor sent by the LPC factor correcting section 4 and decodes it into a noise waveform. As described above, this embodiment makes it possible to convert the spectrum of the synthesis filter 3*c* into an almost flat characteristic, prevent the characteristic of the noise waveform from being unnaturally stressed, and control the reproduction of aurally rasping noises by controlling the filter factor when encoding a signal in the noise part. Therefore, It is possible to improve the voice quality of portable mobile communication systems such as a portable telephone and a car telephone.

EMBODIMENT 4

In the case of embodiment 4, an embodiment of the voice encoding apparatus of the present invention is described.

Figure 5:
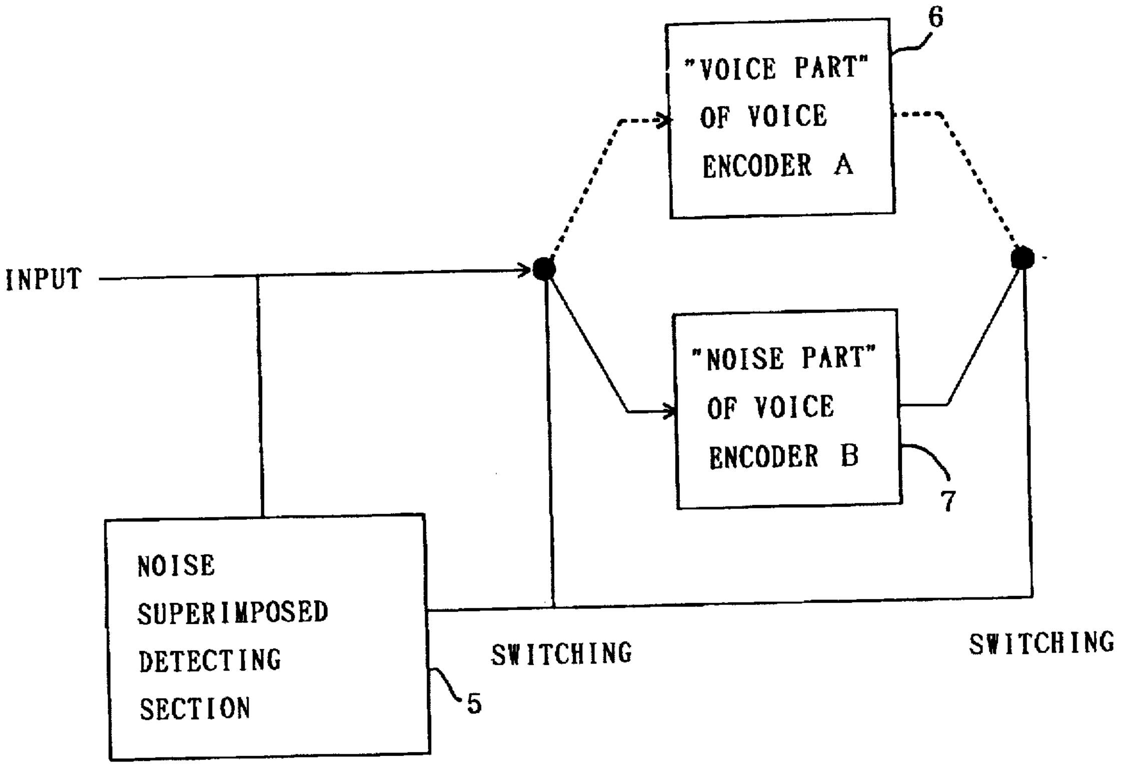
FIG. 5 is a schematic block diagram of the voice encoding system of embodiment 4.

FIG. 5 is a schematic block diagram of the voice encoding apparatus.

In FIG. 5, the voice encoding apparatus comprises a voice encoder A (6), a voice encoder B (7), and a noise superimposition detection judging unit 5.

The noise superimposition detection judging unit 5 has a operation for detecting the power of a waveform signal inputted from a telephone transmitter and judging that the signal is a signal in the voice part containing voices when the power is equal to or larger than a threshold and the signal is a waveform signal in the noise part containing noise only when the power is less than the threshold. Moreover, the noise superimposition detection judging unit 5 has a operation for inputting a waveform signal in the voice part to the voice encoder A (6) and a waveform signal in the noise part to the voice encoder B (7).

The voice encoder A (6) is an existing CELP-system encoder having a operation for encoding a waveform signal in the voice part.

The voice encoder B (7) has a operation for encoding a waveform signal in the noise part.

Figure 6:
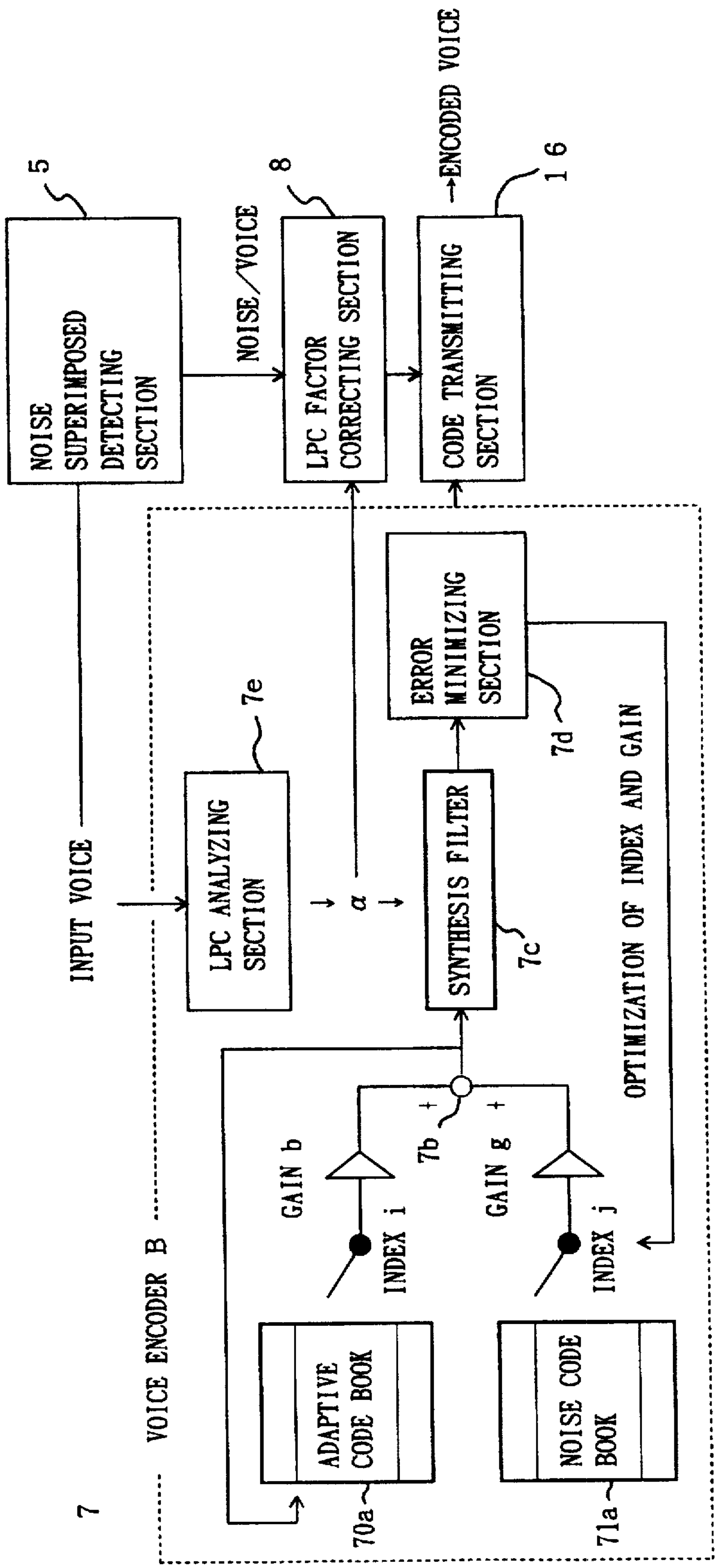
FIG. 6 is a block diagram of the internal structure of a voice encoder B.

FIG. 6 shows the internal structure and the peripheral structure of the voice encoder B (7).

In FIG. 6, the voice encoder B (7) comprises an adaptive code book 70*a*, a noise code book 71*a*, a driving sound source 7*b*, a synthesis filter 7*c*, an LPC analyzing section 7*e*, and an error minimizing section 7*d*.

The adaptive code book 70*a* stores patterns of waveforms having a periodicity and index information for specifying individual waveform pattern.

The noise code book 71*a* stores patterns of waveforms having no periodicity and index information for specifying individual waveform pattern.

The driving sound source 7*b* has a operation for exciting a waveform pattern detected from the adaptive code book 70*a* and a waveform pattern detected from the noise code book 71*a* in accordance with the gain each code book.

The synthesis filter 7*c* has a operation for filtering a waveform signal in the noise part by using the linear prediction factor of the waveform signal as a filter factor.

The error minimizing section 7*d* has a operation for comparing a waveform signal outputted from the synthesis filter 7*c* with the waveform of an input noise signal, optimizing index information and the amplification factor (gain) of a waveform pattern, and updating the contents of the noise code book 71*a*.

The LPC analyzing section 7*e* has a operation for linear-prediction-analyzing an input waveform to compute a linear prediction factor and inputting the input waveform to the synthesis filter 7*c* by using the linear prediction factor as a filter factor.

Moreover, the voice decoder B (7) connects with a code transmitting section 16 and an LPC factor correcting section 4.

The code transmitting section 16 has a operation for transmitting power information, index information, and a filter factor encoded by the voice decoder B (7) to the transmission side.

The LPC factor correcting section 4 has the same operation as the above embodiment 3 for correcting the filter factor of the synthesis filter 7*c* used to decode an encoded signal in the noise part. Specifically, the control information generating section 8 corrects the filter factor by multiplying the filter factor by a positive value of 1 or less. It is assumed that the code transmitting section 16 transmits the filter factor corrected by the LPC factor correcting section 4 together with other encoded signal correspondingly to the above operation.

Operations of the voice encoding apparatus of this embodiment are described below.

(Operations of voice encoding apparatus)

When a waveform signal is inputted from a telephone transmitter, the noise superimposition detection judging unit 5 detects the power of the waveform signal and judges whether the signal is equal to or larger than or less than a threshold. When the power of the waveform signal is equal to or larger than the threshold, the noise superimposition detection judging unit 5 judges the waveform signal as a signal in the voice part and inputs the waveform signal to the voice encoder A (6).

The voice encoder A (6) encodes waveform information into index information, power information, and a filter factor by using a code book and transmits them to the reception side.

When the power of the input waveform is less than the threshold, the noise superimposition detection judging unit 5 judges that the waveform signal is a waveform signal in the noise part and inputs the waveform to the voice encoder B (7).

The voice encoder B (7) has a operation for retrieving the adaptive code book 70*a* and the noise code book 71*a* in accordance with a waveform in the noise part and detecting similar waveform patterns. Moreover, the voice encoder B (7) inputs a waveform pattern read out of the adaptive code book 70*a* or the noise code book 71*a* to the driving sound source 7*b*.

The driving sound source 7*b* excites the waveform pattern to input it to the synthesis filter 7*c*.

In this case, the LPC analyzing section 7*e* linear-prediction-analyzes an inputted waveform signal to compute a linear prediction factor. Then, the LPC analyzing section 7*e* sends the linear prediction factor to the synthesis filter 7*c*.

The synthesis filter 7*c* filters the excited signal inputted from the driving sound source 7*b* by using the linear prediction factor as a filter factor.

The error minimizing section 7*d* compares a decoded signal outputted from the synthesis filter 7*c* with an inputted waveform signal and sends the index information optimum to minimize the error between the both signals and the gain of a waveform pattern to the adaptive code book 70*a* and the noise code book 71*a*. Then, each code book updates entered contents and gain in accordance with the index information and gain sent from the error minimizing section 7*d* and sends updated index information to the code transmitting section 16. Moreover, the LPC factor correcting section 4 corrects the linear prediction factor (filter factor) computed by the LPC analyzing section 7*e* by multiplying the factor by a positive value of 1 or less. Then, the LPC factor correcting section 4 sends the corrected filter factor to the code transmitting section 16.

The code transmitting section 16 sends the index information and power information sent from the voice encoder B (7) and the filter factor sent from the LPC factor correcting section 4 to the reception side.

Thereby, it is possible, at the reception side, to convert the spectrum of the synthesis filter into a flat characteristic and prevent a waveform in the noise part from being unnaturally decoded by performing decoding with the corrected filter factor.

As described above, this embodiment makes it possible to convert the spectrum of a synthesis filter into a flat characteristic, prevent the frequency characteristic of a noise part from becoming unnatural, and control aurally rasping noises when decoding the noise part.

EMBODIMENT 5

The fifth embodiment of the present invention is described below by referring to the accompanying drawings.

Figure 7:
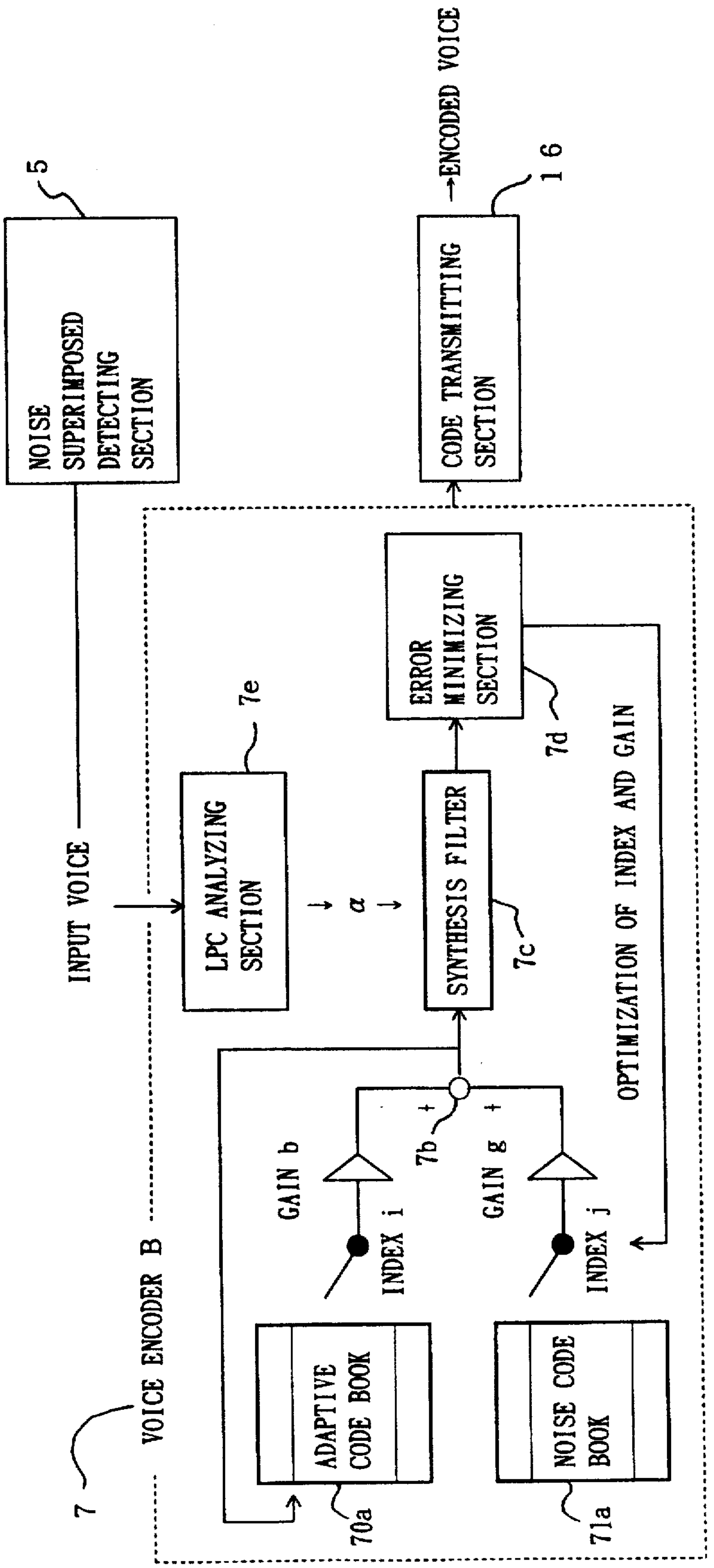
FIG. 7 is a block diagram of the internal structure of the voice encoder B of embodiment 5.

FIG. 7 shows the internal structure of the voice encoder B of this embodiment.

In FIG. 7, the voice encoder B (7) comprises an adaptive code book 70*a*, a noise code book 71*a*, a driving sound source 7*b*, a synthesis filter 7*c*, an LPC analyzing section 7*e*, and an error minimizing section 7*d*, compared to the voice encoder B (7) of the above embodiment 4. Moreover, the voice encoder B (7) connects with a code transmitting section 16.

The code transmitting section 16 has a operation for transmitting "0" as index information of the adaptive code book 70*a* when transmitting an encoded signal in a noise part containing only noises. Other structures and operations of this embodiment are the same as those of the above embodiment 4. Therefore, the description of them is omitted.

Figure 8:
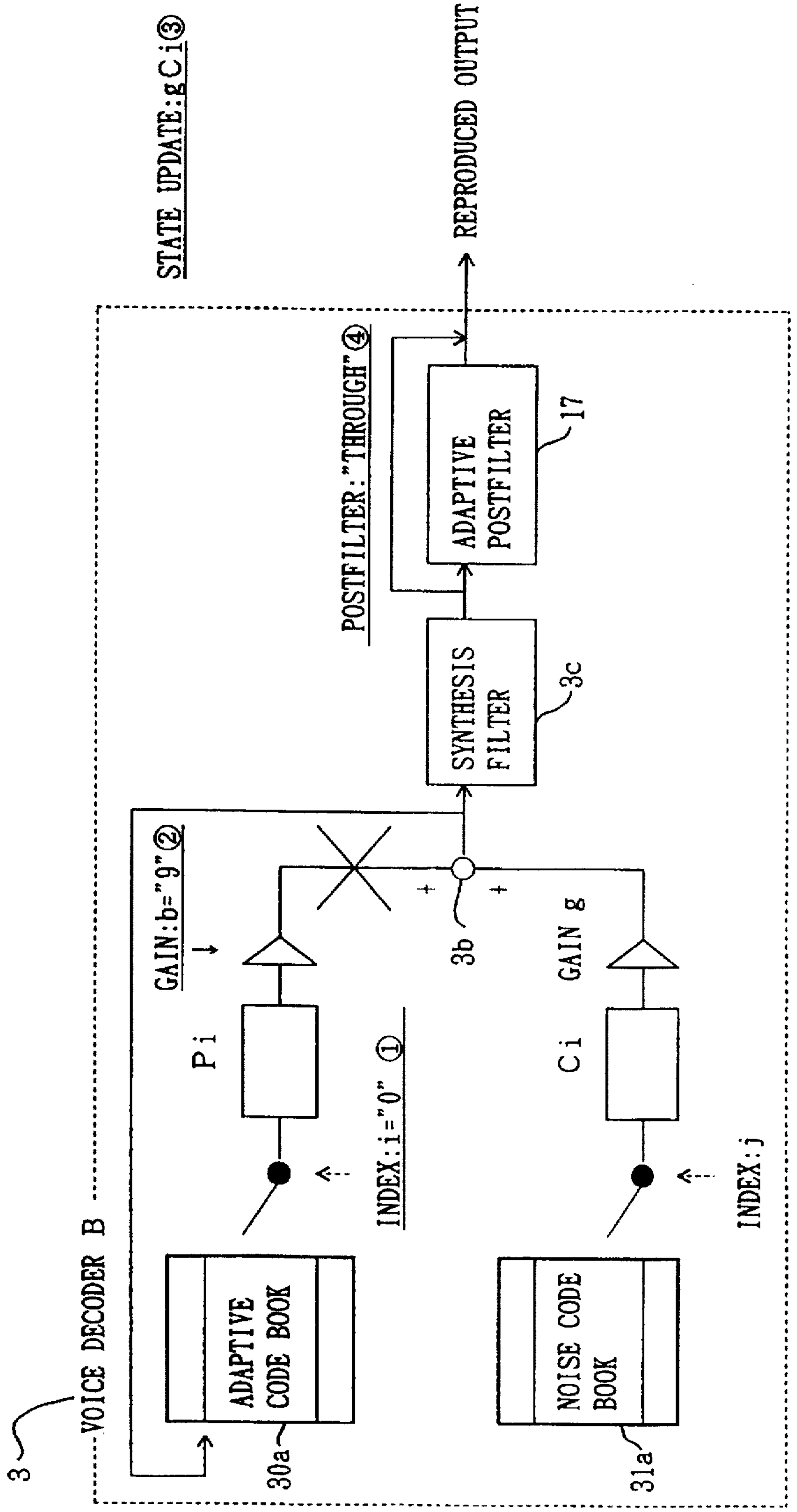
FIG. 8 is a block diagram of the internal structure of the voice decoder B of embodiment 5.

FIG. 8 is a block diagram showing the structure of the voice decoder B (3) corresponding to the voice encoder B (7) in FIG. 7.

The voice decoder B (3) comprises an adaptive code book 30*n*, a noise code book 31*a*, a driving sound source 3*b*, a synthesis filter 3*c*, and an adaptive postfilter 17, compared to the structure of the above embodiment 3.

The adaptive postfilter 17 has a operation for amplifying the amplitude of a waveform without changing the cycle of it.

Moreover, when the adaptive code book 30*a* receives the index information "0" of the adaptive code book 30*a* from the transmission side, it decreases the gain of the adaptive code book 30*a* to "0". Thereby, the adaptive code book 30*a* has a operation for retrieving the noise code book 31*a* in accordance with the index information of the noise code book 31*a* and reading a necessary waveform pattern from the book 31*a* when a waveform signal in the noise part is inputted. Moreover, when a waveform signal in the noise part is inputted, the adaptive postfilter 17 passes the waveform signal without applying any processing to the signal.

This embodiment 5 makes it possible to decode a noise signal with a flat characteristic but no periodicity into an aurally natural waveform signal without adding an unnatural periodicity to the noise signal by encoding and decoding a noise waveform with no periodicity in accordance with a noise code book.

EMBODIMENT 6

Figure 9:
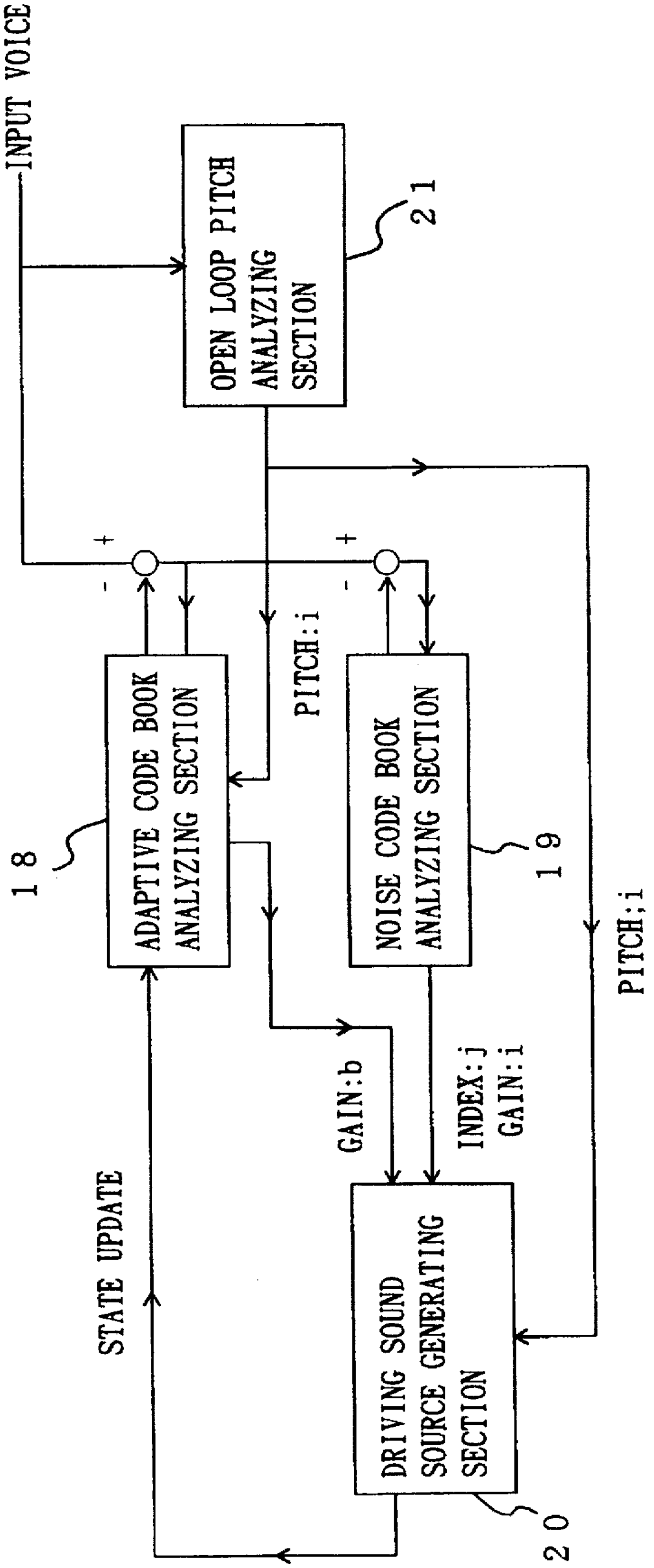
FIG. 9 is a schematic block diagram of the voice encoding system of embodiment 6.

FIG. 9 shows the structure of the voice encoder B of this embodiment. The voice encoder B (7) comprises an adaptive code book analyzing section 18, a noise code book analyzing section 19, a driving sound source generating section 20, and an open-loop pitch analyzing section 21.

Figure 10:
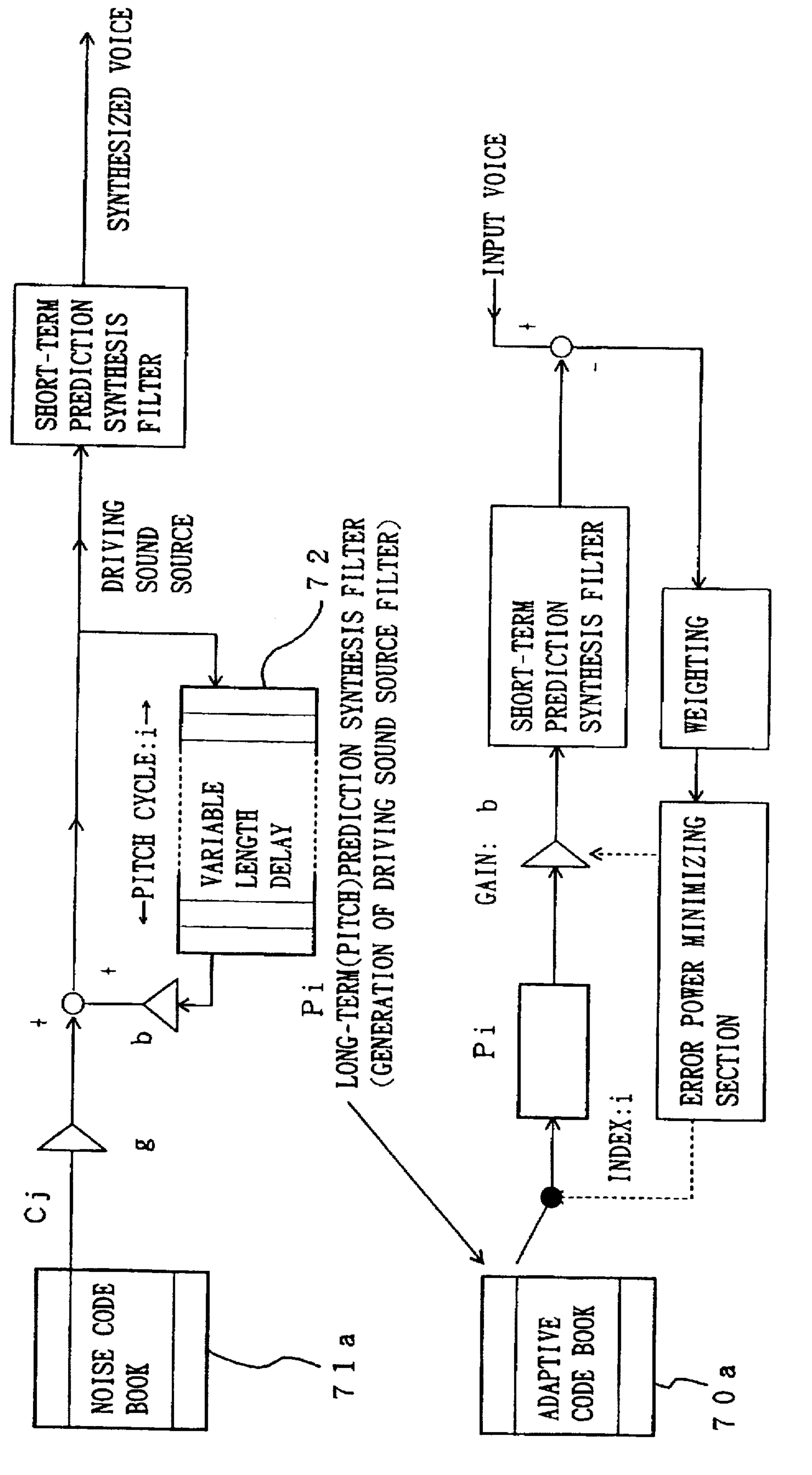
FIG. 10 is a block diagram showing the internal structure of an adaptive code book analyzing section.

The adaptive code book analyzing section 18 has a operation for filtering a waveform signal detected out of the noise code book 71*a* by a long-term prediction synthesis filter 72 and performing closed-loop processing for computing a pitch cycle of the waveform signal (see FIG. 10).

Figure 11:
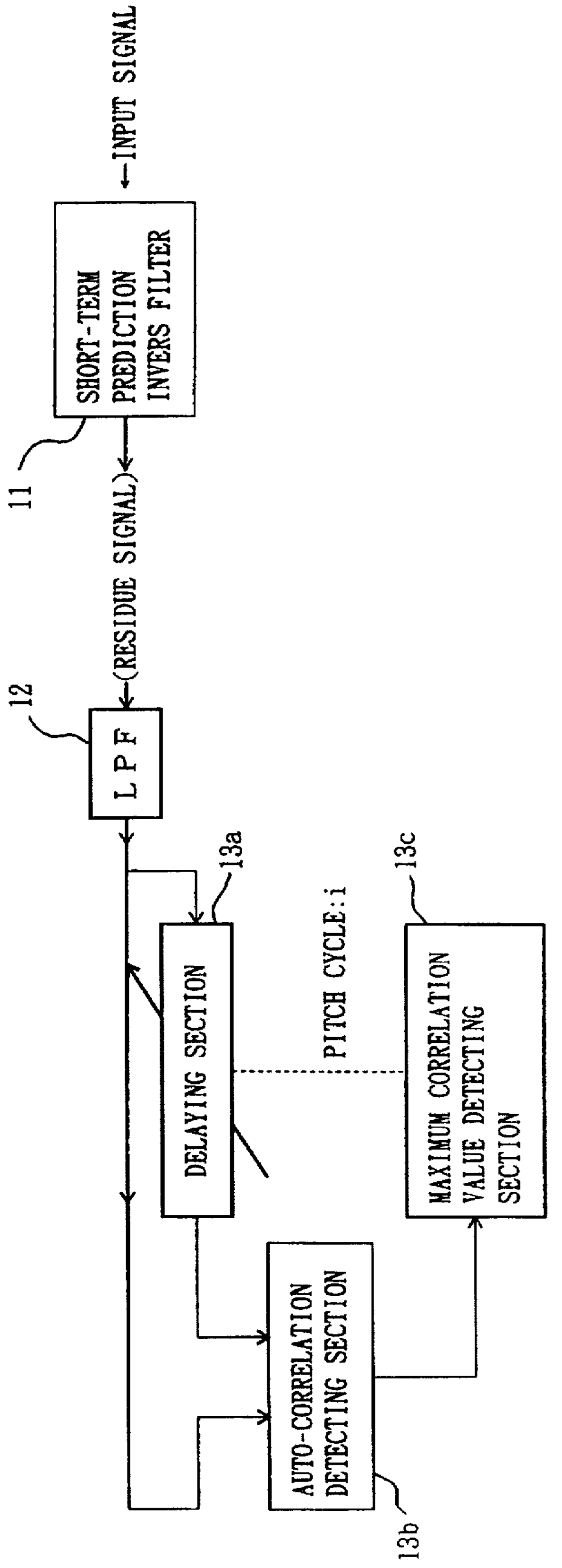
FIG. 11 is a block diagram of the internal structure of an open loop analyzing section.

The open-loop pitch analyzing section 21 is started to encode a noise superimposed part in which a noise waveform is superimposed on a voice waveform and comprises a short-term prediction inverted filter 11, a low-pass filter LPF 12, an auto-correlation detecting section 13*b*, a maximum correlation value detecting section 13*c*, and a delaying section 13*a* (see FIG. 11).

The short-term prediction inverted filter 11 has a operation for performs inverse filtering by using the linear prediction factor of a waveform signal as a filter factor and outputting a prediction residue signal.

The low-pass filter LPF 12 has a operation for removing noise waveforms from the prediction residue signal.

The delaying section 13*a* has a operation for shifting the cycle of the prediction residue signal every certain cycle.

The auto-correlation detecting section 13*b* has a operation for detecting a correlation value between the original prediction residue signal and the prediction residue signal whose cycle is shifted by a certain value by the delaying section 13*a*.

The maximum correlation value detecting section 13*c* has a operation for detecting a delay (cycle) when a cycle is shifted every certain value by the delaying section 13*a* and a correlation value is maximized. The delay is sent to the driving sound source 7*b* as a pitch cycle. Then, the driving sound source 7*b* excites a waveform pattern read out of the adaptive code book 70*a* in accordance with the pitch cycle.

As described above, this embodiment 6 makes it possible to accurately detect a pitch cycle of a voice waveform on which noises are superimposed, perform high-quality encoding without being affected by noises, and improve the quality of reproduced voices.

What is claimed is:

1. A voice decoding apparatus comprising:

noise superimposed part detecting means for detecting information showing the frequency characteristic of voice or noise from a signal encoded at a transmission side and discriminating an encoded signal in a noise part containing only noise from an encoded signal in a voice part containing voice in accordance with the frequency characteristic, voice decoding means for decoding an encoded signal in a voice part into a waveform signal when said noise superimposed part detecting means judges the voice part;

noise decoding means for decoding an encoded signal in a noise part into a waveform signal when said noise superimposed part detecting means judges the noise part; and noise control means for controlling the frequency characteristic of said noise part by controlling said noise encoding means when said noise superimposed part detecting means judges a noise part.

2. The voice decoding apparatus according to claim 1, wherein said noise decoding means is provided with;

a code book for storing individual waveform patterns and index information to specify the waveform pattern, a driving sound source for exciting a waveform pattern read out of said code book, and a synthesis filter for filtering an excited signal outputted from said driving sound source in accordance with the frequency characteristic of said noise part; and wherein said noise control means controls the frequency characteristic of said noise part by controlling the filter factor of said synthesis filter.

3. The voice decoding apparatus according to claim 1, wherein said frequency characteristic includes at least power information for voice or noise, and said noise superimposed part detecting means judges said encoded signal as a signal in a voice part when the power of voice or noise is equal to or more than a preset threshold and judges said encoded signal as a signal in a noise part when said power is less than said threshold.

4. The voice decoding apparatus according to claim 2, wherein said frequency characteristic includes at least the gain of said code book, and said noise superimposed part detecting means judges the encoded signal as a signal in a voice part when the gain of said encoded signal is equal to or more than a preset threshold and judges the encoded signal as a signal in a noise part when the gain is less than the threshold.

5. The voice decoding apparatus according to claim 2, wherein a postfilter is included which amplifies the amplitude value of a decoded signal outputted from said synthesis filter, and said postfilter passes the decoded signal inputted from the synthesis filter of said noise decoding means without amplifying the amplitude of the signal.

6. A voice encoding apparatus for sending signal to a voice decoding apparatus, said voice encoding apparatus comprising:

voice input means for inputting voice signal;

noise superimposed part detecting means for discriminating whether a signal inputted from a telephone transmitter is a signal in a voice part containing voice or a signal in a noise part containing only noise;

voice encoding means for encoding a voice part when said noise superimposed part detecting means determines the voice part;

noise encoding means for encoding a noise part when said noise superimposed part detecting means determines the noise part; and control information generating means for generating control information for controlling a filter factor of a synthesis filter of said voice decoding apparatus according to a frequency characteristic of said noise part and for sending the control information to said voice decoding apparatus.

7. The voice encoding apparatus according to claim 6, wherein said control information is a positive value of 1 or less to be multiplied with the filter factor of said synthesis filter.

8. A voice encoding apparatus comprising:

noise superimposed part detecting means for monitoring a voice inputted from a telephone transmitter and judging whether the voice is a voice in a voice part containing only voices or a voice in a noise part containing only noises or a voice in a noise superimposed part in which noises are superimposed on voices;

inverse filtering means for computing a linear prediction factor in a noise superimposed part when said noise superimposed part detecting means judges the noise superimposed part and performing inverse filtering by using the linear prediction factor as a filter factor;

noise removing means for removing noises from a prediction residue signal outputted from said inverse filtering means;

pitch cycle detecting means for computing the auto-correlation operation of the residue signal outputted from said noise removing means and detecting a pitch cycle when the auto-correlation operation has the maximum value; and voice encoding means for encoding a waveform pattern in said noise superimposed part in accordance with the pitch cycle detected by said pitch cycle detecting means.

* * * * *

US005717724C1

(12) EX PARTE REEXAMINATION CERTIFICATE (6560th)

United States Patent

Yamazaki et al.

(10) Number: US 5,717,724 C1
(45) Certificate Issued: Dec. 9, 2008

(54) VOICE ENCODING AND VOICE DECODING APPARATUS

(75) Inventors: Yasushi Yamazaki, Kawasaki (JP); Tomohiko Taniguchi, Kawasaki (JP); Tomonori Sato, Kawasaki (JP); Hisanari Kimura, Fukuoka (JP)

(73) Assignee: Fujitsu Limited, Nakahara-Ku, Kawasaki-shi, Kanagawa (JP)

Reexamination Request:
No. 90/007,425, Feb. 17, 2005

Reexamination Certificate for:
Patent No.: 5,717,724
Issued: Feb. 10, 1998
Appl. No.: 08/511,417
Filed: Aug. 4, 1995

(30) Foreign Application Priority Data

Oct. 28, 1994 (JP) ............................................ 6-265735

(51) Int. Cl.
*H04L 27/06* (2006.01)

(52) U.S. Cl. ................. 375/346; 704/208; 704/E19.035

(58) Field of Classification Search ........................ None
See application file for complete search history.

(56) References Cited

U.S. PATENT DOCUMENTS

| | | | | | |
|---|---|---|---|---|---|
| 5,220,565 | A | * | 6/1993 | Wilson et al. | 370/349 |
| 5,276,765 | A | * | 1/1994 | Freeman et al. | 704/233 |
| 5,307,441 | A | * | 4/1994 | Tzeng | 704/222 |
| 5,414,796 | A | * | 5/1995 | Jacobs et al. | 704/221 |
| 5,485,522 | A | * | 1/1996 | Solve et al. | 381/56 |
| 5,487,087 | A | * | 1/1996 | McCree et al. | 375/245 |
| 5,537,509 | A | * | 7/1996 | Swaminathan et al. | 704/228 |
| 5,548,680 | A | * | 8/1996 | Cellario | 704/219 |
| 5,553,192 | A | * | 9/1996 | Hayata | 704/228 |
| 5,568,514 | A | * | 10/1996 | McCree et al. | 375/245 |
| 5,579,432 | A | * | 11/1996 | Wigren | 704/214 |
| 5,615,298 | A | * | 3/1997 | Chen | 704/228 |
| 5,632,004 | A | * | 5/1997 | Bergstrom | 704/235 |
| 5,633,982 | A | * | 5/1997 | Ganesan et al. | 704/233 |
| 5,657,422 | A | * | 8/1997 | Janiszewski et al. | 704/229 |
| 5,706,394 | A | * | 1/1998 | Wynn | 704/219 |
| 5,903,853 | A | | 5/1999 | Sano | |

FOREIGN PATENT DOCUMENTS

| | | | | |
|---|---|---|---|---|
| EP | 0 335 521 | A1 | * | 4/1989 |
| JP | 2-036628 | | | 2/1990 |
| JP | 2-123400 | | | 5/1990 |
| JP | 6-12095 | A | * | 1/1994 |
| JP | 6-012095 | | | 1/1994 |
| JP | 6-104851 | | | 4/1994 |
| JP | 6-202695 | A | * | 7/1994 |
| JP | 6-202695 | | | 7/1994 |
| JP | 6-268607 | | | 9/1994 |
| JP | 6-282298 | A | * | 10/1994 |
| JP | 6-282298 | | | 10/1994 |

OTHER PUBLICATIONS

Japanese Office Actions from counterpart application related to the new claims with Full Translations.

Southcott, CB, et al., Voice Control of the Pan–European Digital Mobile Radio System, IEEE, 1989, p. 1070–1074, CH2682–3/89/0000–1070, 29B.3.1.

Notice of Reasons for Rejection dated Nov. 1, 2005.

(Continued)

*Primary Examiner*—Roland G. Foster

(57) ABSTRACT

To improve the voice quality of a digital mobile communication system such as a car telephone or portable telephone when outdoor background noises are superimposed on voices. To achieve the above object, a voice decoding apparatus comprises noise superimposed part detecting means for discriminating between a noise part containing only noises and a voice part containing voices from signal encoded at a transmission side, voice decoding means for decoding an encoded signal in the voice part into a waveform signal, noise decoding means for decoding an encoded signal in the noise part into a waveform signal, and noise control means for controlling the frequency characteristic of said noise part by controlling said noise decoding means when said noise superimposed part detecting means judges the noise part.

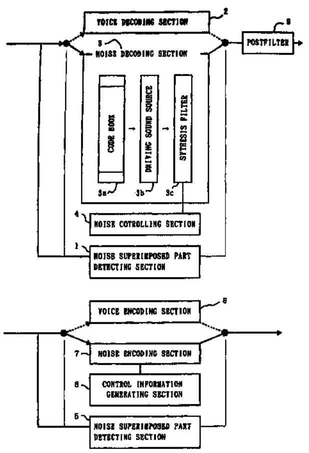

OTHER PUBLICATIONS

L. Cellaro. et al. Variable Rate Speech Coding for UMTS. CSELT Technical Reports vol. 22, No. 1, p. 45–50. Feb. 1994.

Questioning By the Appeal Board dated Mar. 7, 2006, with translation.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 5, 6, 7 and 8 are cancelled.

Claims 1 and 4 are determined to be patentable as amended.

Claim 3, dependent on an amended claim, is determined to be patentable.

New claims 9–12 are added and determined to be patentable.

1. A voice decoding apparatus comprising:

noise superimposed part detecting means for detecting information showing the frequency characteristic of voice or noise from a signal encoded at a transmission side and discriminating an encoded signal in a noise part containing only noise from an encoded signal in a voice part containing voice in accordance with *the information showing* the frequency characteristic *of voice or noise*, voice decoding means for decoding an encoded signal in a voice part into a waveform signal when said noise superimposed part detecting means judges the voice part;

noise decoding means for decoding an encoded signal in a noise part into a waveform signal when said noise superimposed part detecting means judges the noise part; and noise control means for controlling the frequency characteristic of said noise part by controlling said noise [encoding] *decoding* means when said noise superimposed part detecting means judges a noise part,

*wherein the noise decoding means has a noise codebook and an adaptive codebook and, when decoding an encoded signal in the noise part, a gain of the adaptive codebook is set to zero and an output signal of the noise decoding means is from the noise codebook.*

4. The voice decoding apparatus according to claim [2] *1*, wherein said frequency characteristic includes at least the gain of said code book, and said noise superimposed part detecting means judges the encoded signal as a signal in a voice part when the gain of said encoded signal is equal to or more than a preset threshold and judges the encoded signal as a signal in a noise part when the gain is less than the threshold.

*9. The voice decoding apparatus of claim 1, wherein the waveform signal of said noise decoding means is without periodicity.*

*10. The voice decoding apparatus of claim 1, wherein the signal from the transmission side contains information indicating the noise part and when the signal indicates the noise part the gain of the adaptive codebook is set to zero.*

*11. A voice coding system comprising the voice decoding apparatus of claim 1 and a voice encoding apparatus, said voice encoding apparatus comprising:*

*a voice activity detector for discriminating whether an input signal is a signal in a voice part containing voice or a signal in a noise part containing only noise;*

*voice encoder encoding a voice part when said voice activity detector determines the voice part;*

*noise encoder encoding a noise part when said voice activity detector determines the noise part; and*

*control information generator generating control information for controlling a filter factor of a synthesis filter of said voice decoding apparatus according to a frequency characteristic of said noise part and for sending the control information to said voice decoding apparatus.*

*12. A voice decoding apparatus comprising:*

*noise superimposed part detecting means for detecting information showing the frequency characteristic of voice or noise from a signal encoded at a transmission side and discriminating an encoded signal in a noise part containing only noise from an encoded signal in a voice part containing voice in accordance with the frequency characteristic,*

*voice decoding means for decoding an encoded signal in a voice part into a waveform signal when said noise superimposed part detecting means judges the voice part;*

*noise decoding means for decoding an encoded signal in a noise part into a waveform signal when said noise superimposed part detecting means judges the noise part; and*

*noise control means for controlling the frequency characteristic of said noise part by controlling said noise decoding means when said noise superimposed part detecting means judges a noise part,*

*wherein the noise decoding means has a noise codebook and an adaptive codebook and, when decoding an encoded signal in the noise part, a gain of the adaptive codebook is set to zero and a noise decoding means output based upon the noise codebook, thereby not adding periodicity.*

* * * * *